UNITED STATES PATENT OFFICE.

WILLIS B. MARVIN, OF NEW YORK, N. Y.

COMPOUND FILLING FOR FIRE-PROOF STRUCTURES, SUCH AS SAFES, CHESTS, BANK-VAULTS AND DOORS.

SPECIFICATION forming part of Letters Patent No. 236,506, dated January 11, 1881.

Application filed December 9, 1880. (No specimens.)

*To all whom it may concern:*

Be it known that I, WILLIS B. MARVIN, of the city, county, and State of New York, have invented a new and useful Improvement in Compound Fillings for Fire-Proof Structures, such as Safes, Chests, Bank-Vaults and Doors; and I do hereby declare that the following is a clear and exact description of the same.

My improvement relates to that class of mixtures of materials used for filling the spaces between the outer and inner walls or shells of fire-proof structures, which are composed partly of a crystallized salt holding a large percentage of its weight of water of crystallization, such as sulphate of alumina and potash, sulphate of alumina and soda, and potassa-ferric sulphate, and dry non-conducting neutral earthy powders, as calcined gypsum or plaster-of-paris and calcined clay. It especially relates to the filling, mixture, or compound for which a patent was granted to my father, Walter K. Marvin, by the United States Patent Office, bearing date of December 1, 1863, (No. 40,800,) which was formed by mixing alum in small pieces with powdered and calcined gypsum or plaster-of-paris, the latter being dry and the best non-conducting material practicable to use for the purpose known, and the former in effect dry, but holding sufficient water to be liberated in case of an exposure to fire to preserve the contents of the inclosed chamber, and set the plaster-of-paris in a porous solid mass without shrinkage. Exposures of structures lined with the last-named mixture to fire have proved it to possess all the qualities set forth in the specification and claim of that patent. It was permanently dry, and articles inclosed within it never dampened or molded. When exposed to fire it admirably preserved the contents of the inclosed chamber from destruction.

Either of the alums hereinbefore named, when heated, give off sulphuric-acid vapor in company with vapor of water or steam, and entering the inner chamber corrode some kind of valuable property kept in such receptacles. At times, when the iron structure has not been heated so high as to materially damage it, the acid vapors institute a rusting similar to that of the wet set plaster filling, now little if at all used for lining safes. To remedy these and facilitate the labor of packing the mixture uniformly in the spaces of the safe inclosing the inner chamber are the objects of my invention.

To enable others to make and use my invention, I now proceed to describe the manner in which the same may be carried into effect.

I take finely-powdered and calcined gypsum, sixty parts, by weight; sulphate of alumina and potash, or sulphate of alumina and soda, broken into small pieces varying from a grain to half an ounce in weight, forty parts, and dry powdered caustic lime, ten parts, (or, in place of the latter, powdered dry carbonate of lime, fifteen parts;) dry fibrous asbestus, fifteen parts. Intimately mix the whole and pack the mass into the safe between the inner and outer plates or shells, and also fill the space within the door formed by the inner and outer plates thereof. The mixture should be uniformly and densely packed throughout. If potassa-ferric sulphate is employed in place of either of the other sulphates named, the proportions should be the same, except, instead of ten parts of lime, thirteen parts should be added, or of the carbonate of lime twenty parts. The proportions I have named of lime and carbonate of lime are a little in excess of the equivalent of the acid of the salt, as I prefer. It is obvious that not only these, but also the proportions of the other ingredients, may be considerably varied. I do not confine myself therefore to the precise proportions herein specified.

The asbestus, added to facilitate the packing of the mixture uniformly and densely, may be omitted from the mixture and the other ingredients employed in the proportions specified.

The lime or carbonate of lime may be left out and the mixture be made to consist of sulphate of lime, the crystallized salts or sulphates named, and asbestus, in about the proportions specified. Therefore I do not confine myself to the precise proportions hereinbefore specified; but

What I claim as my invention is—

1. The herein-described compound or mixture for filling safes and other fire-proof structures, the same consisting of a mechanical mixture or combination of powdered and calcined sulphate of lime with either or all of the crystallized sulphates specified, dry lime, or the carbonate of lime, and fibrous asbestus, in about the proportions named.

2. The mixture or compound described, consisting of the dry sulphate of lime, the crystallized sulphates and dry lime, or carbonate of lime, in about the proportions specified, and for the purposes set forth.

3. The mixture or compound described, consisting of the dry sulphate of lime, the crystallized sulphates, and asbestus, in about the proportions designated, and for the purpose described.

In testimony whereof I affix my signature in presence of two witnesses.

WILLIS B. MARVIN.

Witnesses:
 GEO. H. DICKSON,
 C. H. MONSELL.